United States Patent

[11] 3,596,394

| [72] | Inventor | Thomas E. Reeder<br>Seal Beach, Calif. |
|---|---|---|
| [21] | Appl. No. | 838,449 |
| [22] | Filed | July 2, 1969 |
| [45] | Patented | Aug. 3, 1971 |
| [73] | Assignees | Robert Marvin Olson;<br>Millard T. Chase; Fern C. Chase, , part interest to each |

[54] LIVE BAIT BARGE
11 Claims, 7 Drawing Figs.

[52] U.S. Cl. .................................................... 43/6.5,
43/8, 43/55
[51] Int. Cl. .................................................... A01k 97/04,
A01k 73/12
[50] Field of Search .......................................... 43/8, 6.5,
4.5, 14, 55; 114/.5; 9/1

[56] References Cited
UNITED STATES PATENTS
478,579  7/1892  Dunham ........................ 43/8

| 1,745,251 | 1/1930 | Enright | 43/6.5 |
| 2,651,874 | 9/1953 | Key | 43/6.5 |
| 3,124,890 | 3/1964 | Puretic | 43/6.5 |

Primary Examiner—Warner H. Camp
Attorney—Fulwider, Patton, Rieber, Lee & Utecht

ABSTRACT: A live bait barge having a frame which supports a bait-receiving tank. The tank is provided with a bait-admitting opening and a gate for such opening. The gate is normally closed so as to retain bait within the tank. To load bait into the tank the barge is moved to a position adjacent a bait-receiving net. The net is attached to the barge so that the opening faces the confines of the net. The gate is then opened relative to the opening and bait swim from within the confines of the net to within the confines of the tank. The bait tank after being loaded is moved to its bait-dispensing station. The barge is provided with apertures to permit the free flow of ambient sea water relative to the confines of the bait tank.

PATENTED AUG 3 1971

INVENTOR.
Thomas E. Reeder,

By Fulwider, Patton, Rieber, Lee & Utecht
ATTORNEYS

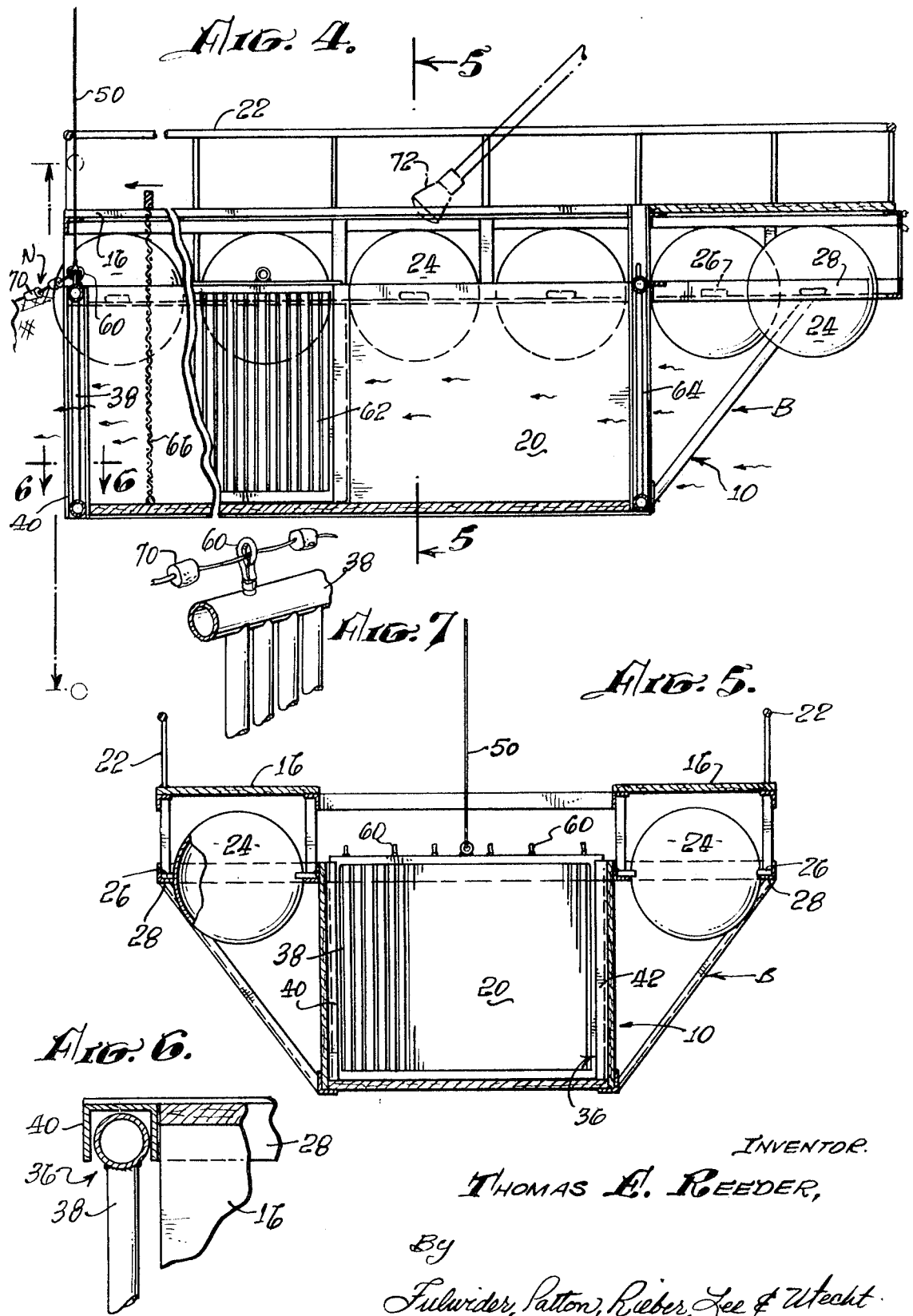

3,596,394

LIVE BAIT BARGE

BACKGROUND OF THE INVENTION

1. Field of the Invention

The present invention relates generally to the art of fishing and more particularly to a novel live bait barge which is loaded from a bait-receiving net whereafter the barge is moved to its bait-dispensing position.

2. Description of the Prior Art

Conventional live bait barges are anchored at a bait-dispensing position wherein the bait is sold to fisherman who generally temporarily moor their boats to the bait barge. The bait dispensed from the barge is obtained from a bait-receiving net located some distance from the bait-dispensing position of the bait barge. The bait is transferred from the bait-receiving net to the bait barge by means of a bait transfer boat, bait being scooped from the bait-receiving net to the tank or tanks of the bait transfer boat. When the bait transfer boat is moved alongside the conventional bait barge, the bait are scooped from the tank of the transfer boat into the tank of the bait barge. The multiple handling of the bait incurred with a conventional bait barge results in considerable loss thereof because of the unavoidable damage inflicted upon the bait during the scooping operations.

SUMMARY OF THE INVENTION

The bait barge of the present invention includes a frame having flotation means and supporting a bait-receiving tank. The tank is formed with a bait-admitting opening. A gate member is provided for such opening, with such gate normally covering the opening. Aperture means are formed on the tank to permit the free flow of ambient sea water relative to the confines of the tank. The barge is provided with attachment means temporarily engageable with a bait-receiving net. Operating means are provided for moving the gate from its normal position wherein it covers the bait-admitting opening into a second position wherein the opening is uncovered. In order to load the bait tank of the present invention, it is moved to a position alongside a bait-receiving net. The net is then attached to the bait barge so that the confines of the net are in communication with the bait-admitting opening in the bait tank. The gate is then moved into a position wherein the opening is uncovered and the bait will swim freely from within the net to within the bait tank. The gate is then closed and the net disengaged from the barge. The barge is then moved to its bait-dispensing location.

It will be apparent that the use of the bait barge of the present invention eliminates the multiple handling of the bait required by the use of conventional bait tanks. Accordingly, the bait barge of the present invention affords important economies in connection with the marketing of live bait. Additionally, the use of a bait barge of the present invention is important to the conservation of marine life.

Various other advantages of the present invention will become apparent from the following detailed description.

DESCRIPTION OF THE DRAWINGS

FIG. 4 is a broken vertical sectional view taken in enlarged scale along line 4—4 of FIG. 2;

FIG. 5 is a vertical sectional view taken on line 5—5 of FIG. 4;

FIG. 6 is a horizontal sectional view taken in further enlarged scale along line 6—6 of FIG. 4; and FIG. 7 is a fragmentary perspective view showing a detail of a gate utilized with said bait barge.

DESCRIPTION OF THE PREFERRED EMBODIMENT

Figure 1:
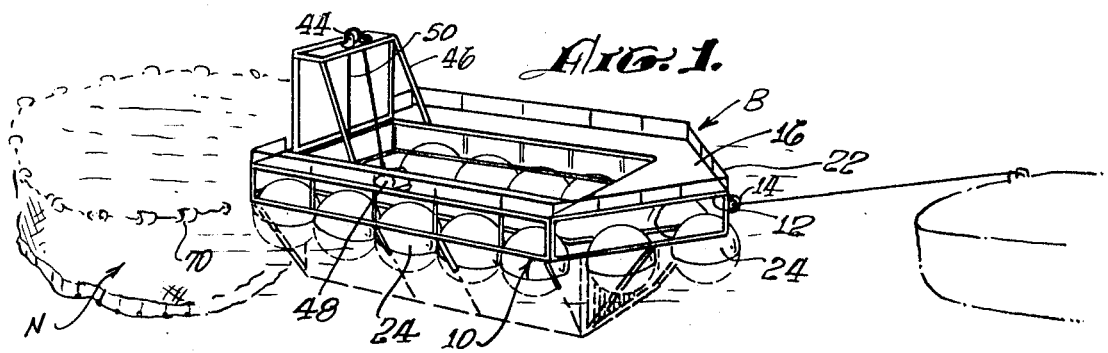
FIG. 1 is a perspective view of a preferred form of live bait barge embodying the present invention showing such barge being loaded with live bait from a bait-receiving net.

Referring to the drawings, there is shown a live-bait barge B embodying the present invention. The bait barge B includes a frame, generally designated 10, defined by a plurality of rigid, structural elements such as steel channel elements rigidly interconnected as by welding. As indicated particularly in FIGS. 2 and 3, the front portion of the frame 10 may define a pointed bow 12 provided with an anchor or tow ring 14. Suitable decking material 16 is provided over the upper portion of the frame 10. The decking 16 surrounds a bait-receiving tank 20 that has its upper edges rigidly affixed to the framework 10. A rail 22 may be provided around the periphery of the decking 16.

The frame is provided with suitable flotation means to afford buoyancy for the frame and the bait tank 20. Conveniently, such flotation means may take the form of a plurality of like hollow balls 24. The balls 24 are arranged along the side and the front of the bait tank 20. Each ball is provided with a pair of mounting lugs 26 which as indicated particularly in FIGS. 4 and 5 are rigidly affixed as by welding to longitudinal elements 28 of frame 10. It should be particularly noted that the frame 10, tank 20 and balls 24 are preferably formed of metal although other types of material may be utilized in their construction.

Figure 2:
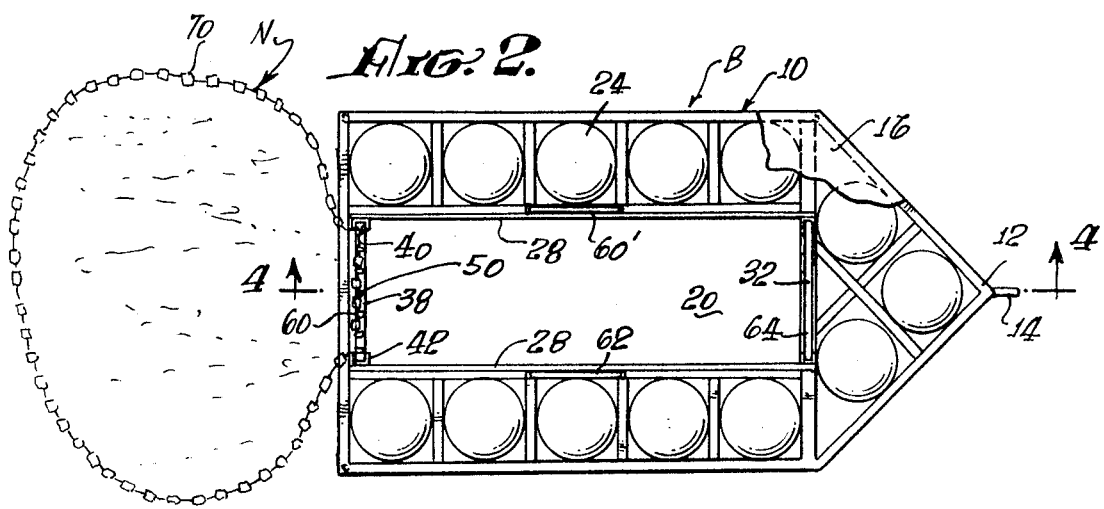
FIG. 2 is a top plane view of said bait barge in enlarged scale.
Figure 3:
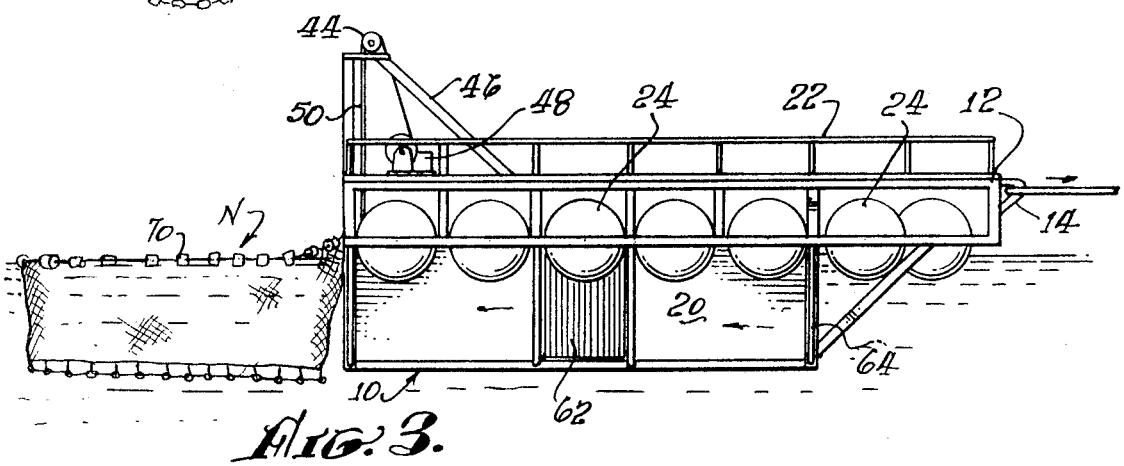
FIG. 3 is a side elevational view of said bait barge.

The rear wall of the tank 20 is open so as to define a bait-admitting opening 36. A gate member 38 is provided for normally closing the opening 36 when such gate is arranged in its position shown in the drawings. As indicated in FIGS. 2 and 4, the opposite sides of the gate 38 are vertically slidably arranged within a pair of generally U-shaped channel sections 40 and 42 disposed on frame 10 at the rear end of the bait tank 20 and defining the sides of the bait-admitting opening 36. The gate is movable vertically either upwardly or downwardly relative to its normal position shown in the drawings by means of a conventional winch 44 supported on a winch pylon 46 disposed at the stern portion of the frame 10. A conventional winch drive 48 effects movement of a winch cable 50, the end of the cable 50 opposite the winch drive 48 being secured to the upper end of the gate 38, as indicated particularly in FIGS. 4 and 5.

The gate 38 is apertured and preferably is formed from a rectangular frame of tubular metallic material, with the upper and lower elements of such rectangular frame being interconnected by a plurality of vertically extending horizontally spaced-apart grills as indicated particularly in FIG. 7. A pair of side flow grills 60' and 62 and a front flow grill 64 are preferably provided in the side and front walls of the bait tank 20. It should be particularly noted that the utilization of these flow grills in combination with the apertured gate 38 permits a free flow of ambient sea water relative to the confines of the tank 20 so as to insure the constant replenishment of such sea water within the tank without requiring pumping. This constant replenishment of sea water insures the well-being of the live bait in tank 20. It should be noted that one or more of the flow grills may take the form of a vertically movable gate such as rear gate 38.

The rear portion of frame 10 is provided with a plurality of attachment means temporarily engageable with a bait-receiving net N. Such attachment means may take the form of hooks 60 which are welded to spaced points on the top of gate 38, as shown in FIG. 7. As indicated particularly in FIG. 4, the rear portion of the bait tank 20 is preferably provided with a vertically extending screen 66. The screen is formed with mesh of a size necessary to screen out junk fish as bait is being admitted through the opening 36. The screen 66 may be removed when desired.

In the operation of the aforedescribed live bait barge B, the barge is towed to a point adjacent a bait-receiving net N, as indicated in FIG. 1. Thereafter, the corks 70 in the cork line of the net N and the portion of the net adjacent thereto is lowered and attached to the hooks 60. In this manner, the confines of the net N are placed in communication with the edges of the bait-admitting opening 36. Assuming the bait is to be loaded is of the free-swimming type such as anchovies, sardines, smelt or the like, the gate 38 is lowered. The bait is then free to swim from the net N into the bait tank 20. Generally, the greater the amount of bait in the net N, the greater the distance the gate 38 is lowered. As indicated in FIG. 4, a light 72 may be utilized to attract the fish from the net N to the bait tank 20 as the net N is dried up. If a bait such as squid is to be loaded, the gate 38 is raised rather than lowered. The squid will then be moved through the lower portion of the bait-admitting opening 36 into the bait tank 20. After the bait-admitting operation has been completed, the gate 38 will be returned to its normal position wherein it seals off the opening 36. The net N will then be disengaged from the barge B and the barge will be towed to its bait-dispensing position. The bait will remain in good condition even where the barge is towed considerable distances and through changes of water temperature. It will be understood that if desired the barge could be provided with its own propulsion means so as to eliminate the necessity of towing.

It should be observed that the barge B may be utilized as a storage facility during periods when live bait is difficult to catch. It should also be noted that the barge B may be employed to capture larger sea life such as whales and porpoises. The provision of the gate 38 and the opening 36 eliminates the necessity of using the conventional sling for moving such larger sea life into a tank for transfer to a shore facility.

Various modifications and changes may be made without departing from the spirit of the present invention.

I claim:

1. A live bait barge comprising:
   a frame;
   flotation means on said frame for floating said frame in a body of water;
   a bait-receiving tank having its upper edges rigidly affixed to said frame, said tank having vertically extending wall members, at least one of which is formed with a bait-admitting opening disposed below the surface of the body of water;
   a gate member on one of said wall members, said gate normally covering said opening;
   aperture means formed on at least one of said members to permit the free flow of ambient sea water relative to the confines of said bait tank;
   a floating bait-containing net;
   attachment means on said gate member temporarily engageable with said net;
   and operating means on said frame secured to said gate member for moving said gate member from its normal position into a second position wherein said gate member uncovers said opening to permit bait to swim from within the confines of said net to within the confines of said tank.

2. A live bait barge as set forth in claim 1 wherein said gate member is movable vertically either up or down from its normal position into its second position.

3. A live bait barge barge as set forth in claim 2 wherein said operating member includes a winch mounted upon said frame and connected to said gate member by a cable.

4. A live bait barge as set forth in claim 2 wherein a screen is disposed adjacent said gate member to restrain junk fish from entering said bait tank.

5. A live bait barge as set forth in claim 1 wherein said operating member includes a winch mounted upon said frame and connected to said gate member by a cable.

6. A live bait barge as set forth in claim 5 wherein a screen is disposed adjacent said gate member to restrain junk fish from entering said tank.

7. A live bait barge as set forth in claim 1 wherein a screen is disposed adjacent said opening to restrain junk fish from entering said bait tank.

8. A live bait barge as set forth in claim 1 wherein said frame includes structural elements and said flotation means comprise a plurality of ball floats secured to said structural elements.

9. A live bait barge as set forth in claim 8 wherein the rear portion of said frame includes a pair of vertical guides that vertically slidably support the sides of said gate member.

10. A live bait barge as set forth in claim 9 wherein said gate member is movable vertically either up or down from its normal position into its second position.

11. A live bait barge as set forth in claim 1 wherein said attachment means are hooks secured to said gate member.